(12) United States Patent
Ito

(10) Patent No.: US 11,289,763 B2
(45) Date of Patent: Mar. 29, 2022

(54) BATTERY MODULE AND MANUFACTURING METHOD OF BATTERY MODULE

(71) Applicant: Honda Motor Co., Ltd., Tokyo (JP)

(72) Inventor: Keiichi Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 16/589,065

(22) Filed: Sep. 30, 2019

(65) Prior Publication Data

US 2020/0106065 A1 Apr. 2, 2020

(30) Foreign Application Priority Data

Oct. 2, 2018 (JP) .............................. JP2018-187440

(51) Int. Cl.
*H01M 2/10* (2006.01)
*H01M 10/04* (2006.01)
(Continued)

(52) U.S. Cl.
CPC ....... *H01M 50/20* (2021.01); *H01M 10/0413* (2013.01); *H01M 10/0486* (2013.01); *H01M 10/647* (2015.04); *H01M 10/6555* (2015.04); *H01M 50/502* (2021.01); *H01M 50/543* (2021.01); *H01M 2220/20* (2013.01)

(58) Field of Classification Search
None
See application file for complete search history.

(56) References Cited

U.S. PATENT DOCUMENTS 9,583,747 B2 * 2/2017 Baek .................... H01M 50/20
9,882,177 B2 * 1/2018 Thurmeier ............. B60L 50/64
(Continued)

FOREIGN PATENT DOCUMENTS

| CN | 1992385 | 7/2007 |
|---|---|---|
| CN | 103296230 | 9/2013 |

(Continued)

OTHER PUBLICATIONS

Merriam-Webster Online Dictionary entry for "grappling" (verb) and "grapple" (noun), accessed at https://www.merriam-webster.com/dictionary/grapple on Jul. 7, 2021 (Year: 2021).*
(Continued)

*Primary Examiner* — Amanda J Barrow
(74) *Attorney, Agent, or Firm* — JCIPRNET

(57) ABSTRACT

A battery and a manufacturing method thereof are provided. The battery module includes: a battery cell group, in which a plurality of battery cells is laminated; a pair of end plates, which is arranged on two end portions of the battery cell group; and restraint members, which are disposed over the pair of end plates and restrain the battery cell group between the pair of end plates. The restraint members are coupled by grappling structures to the pair of end plates on two end portions along the lamination direction the battery cells, and the pair of end plates clamps the battery cell group in a state that the battery cell group is compressed and pulling forces toward opposite directions act on the two end portions of the restraint members by a restoration force when the battery cell group restores from the compression state.

10 Claims, 14 Drawing Sheets

(51) Int. Cl.
*H01M 10/647* (2014.01)
*H01M 10/6555* (2014.01)
*H01M 2/30* (2006.01)
*H01M 2/20* (2006.01)
*H01M 50/20* (2021.01)
*H01M 50/502* (2021.01)
*H01M 50/543* (2021.01)

(56) References Cited

U.S. PATENT DOCUMENTS

| | | | | |
|---|---|---|---|---|
| 2007/0264562 | A1* | 11/2007 | Kang | H01M 10/425 |
| | | | | 429/96 |
| 2010/0190049 | A1* | 7/2010 | Kawase | H01M 10/4285 |
| | | | | 429/159 |
| 2011/0064992 | A1* | 3/2011 | Kim | B60L 50/64 |
| | | | | 429/153 |
| 2011/0159348 | A1* | 6/2011 | Park | H01M 50/20 |
| | | | | 429/151 |
| 2012/0115004 | A1* | 5/2012 | Park | H01M 10/0525 |
| | | | | 429/120 |
| 2013/0224547 | A1* | 8/2013 | Ahn | H01M 10/0413 |
| | | | | 429/99 |
| 2013/0309545 | A1* | 11/2013 | Daubitzer | H01M 10/6556 |
| | | | | 429/120 |
| 2014/0038029 | A1 | 2/2014 | Thurmeier et al. | |
| 2015/0079451 | A1* | 3/2015 | Jeong | H01M 50/20 |
| | | | | 429/151 |
| 2018/0019455 | A1* | 1/2018 | Chen | H01M 50/20 |
| 2018/0034024 | A1* | 2/2018 | Chen | H01M 6/5038 |
| 2018/0212212 | A1* | 7/2018 | Cao | H01M 50/256 |

FOREIGN PATENT DOCUMENTS

| | | |
|---|---|---|
| CN | 106654103 | 5/2017 |
| JP | 2001167745 | 6/2001 |
| JP | 2004349202 | 12/2004 |
| JP | 2007073509 | 3/2007 |
| JP | 2012164545 | 8/2012 |
| JP | 2013175464 | 9/2013 |
| JP | 2015056399 | 3/2015 |
| JP | 2015518258 | 6/2015 |
| WO | 2017017913 | 2/2017 |
| WO | 2018098414 | 5/2018 |

OTHER PUBLICATIONS

"Office Action of China Counterpart Application" with English translation thereof, dated Dec. 3, 2021, p. 1-p. 17.

"Office Action of Japan Counterpart Application" with English translation thereof, dated Nov. 30, 2021, p. 1-p. 12.

* cited by examiner

BATTERY MODULE AND MANUFACTURING METHOD OF BATTERY MODULE

CROSS-REFERENCE TO RELATED APPLICATION

This application claims the priority of Japan patent application serial no. 2018-187440, filed on Oct. 2, 2018. The entirety of the above-mentioned patent application is hereby incorporated by reference herein and made a part of this specification.

BACKGROUND

Technical Field

The disclosure relates to a battery module restraining, by a pair of end plates and restraint members, a battery cell group in which a plurality of battery cells is laminated, and to a manufacturing method of battery module.

Related Art

In a hybrid car or an electric car, a battery module such as a lithium ion secondary battery having a battery cell group in which a plurality of battery cells are laminated is installed. The battery cells expand due to charge and discharge or deterioration, and thus in the battery module, end plates are usually arranged respectively on two end portions of the battery cell group along a lamination direction of the battery cells, the space between the pair of end plates are restrained by restraint members such as bind bars, and thereby the battery cell group is compressed and clamped between the pair of end plates to suppress expansion of the battery cells.

Conventionally, the following battery module is known in which two end portions of restraint members are bent at a substantially right angle, and the bent end portions of the restraint members are arranged on outer end surfaces of a pair of end plates to restrain a battery cell group between the pair of end plates (for example, see patent literature 1).

[Patent literature 1] Japanese Laid-Open publication No. 2001-167745

If the battery cells expand, pulling stress is applied to the restraint members via the end plates. Due to this pulling stress, excessive bending stress acts on sites which are bent at a substantially right angle in the restraint members, and there is a risk of causing damage to the restraint members. Therefore, for the restraint members, it is necessary to use a geometrical contrivance to deal with such excessive bending stress or to use expensive high-strength spring steel as a material of the restraint members, which leads to higher costs of the battery module.

SUMMARY (1) The battery module according to the disclosure includes: a battery cell group, in which a plurality of battery cells is laminated; a pair of end plates, which is arranged on two end portions of the battery cell group along a lamination direction of the battery cells; and restraint members, which are disposed over the pair of end plates and restrain the battery cell group between the pair of end plates; wherein the restraint members are coupled by grappling structures to the pair of end plates on two end portions of the restraint members along the lamination direction of the battery cells, and the pair of end plates clamps the battery cell group in a state that the battery cell group is compressed along the lamination direction of the battery cells, and pulling forces toward opposite directions act on the two end portions of the restraint members by a restoration force when the battery cell group restores from the compression state.

(8) The manufacturing method of battery module according to the disclosure includes: arranging end plates on two end portions of a lamination direction of battery cells in a battery cell group configured by laminating a plurality of battery cells; compressing the battery cell group along the lamination direction of the battery cells by applying a compression force to the battery cell group via the pair of end plates; arranging restraint members along the lamination direction of the battery cells on the battery cell group being in a compression state; and using a restoration force of the battery cell group by releasing the compression force toward the battery cell group to grapple and couple two end portions of the restraint members by the pair of end plates, and pulling forces toward opposite directions are made acting on the two end portions of the restraint members.

DESCRIPTION OF THE EMBODIMENTS

Figure 1:
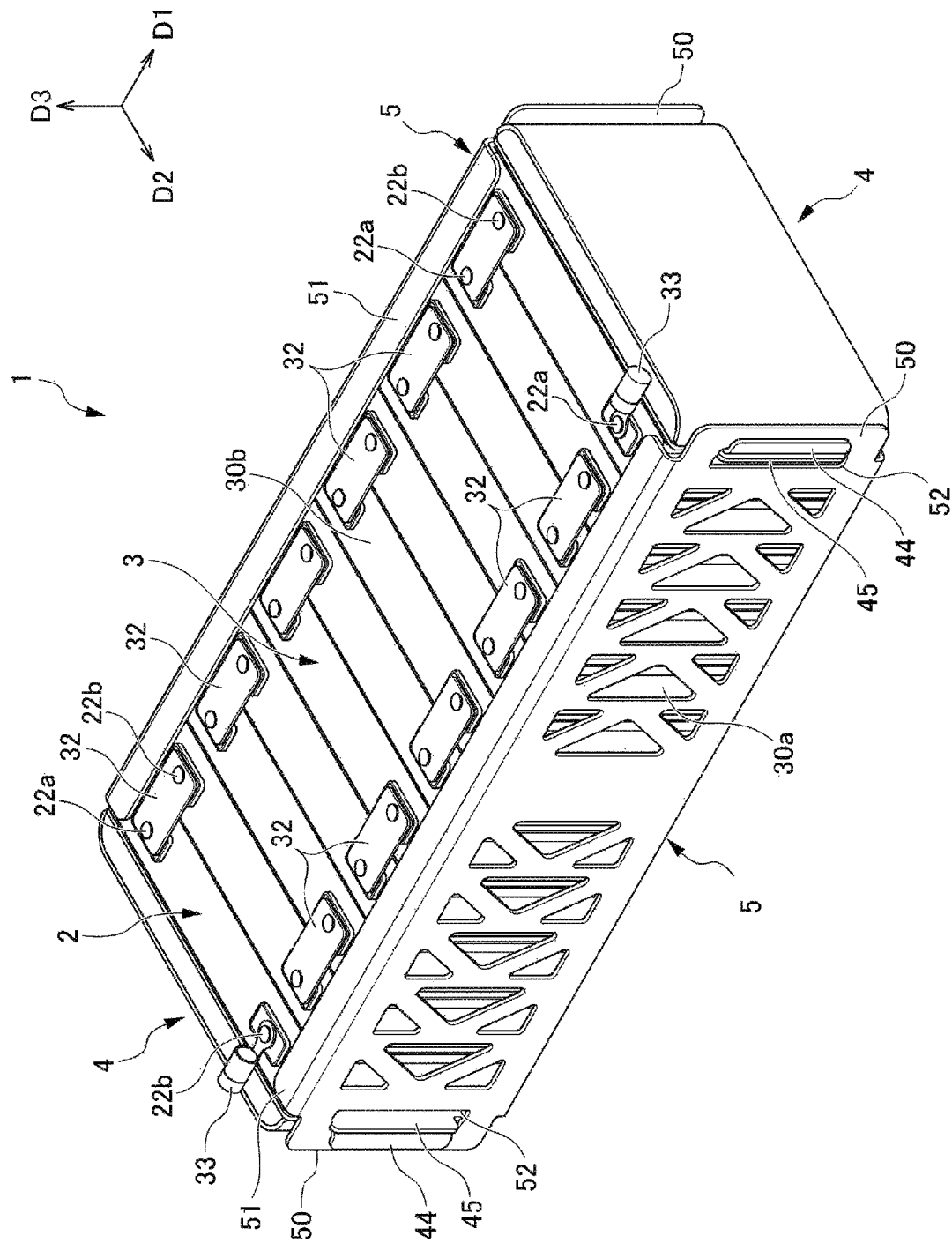
FIG. 1 is an overall perspective view showing one embodiment of a battery module according to the disclosure.

Therefore, the disclosure provides a battery module in which a battery cell group can be restrained between end plates by a simple and inexpensive configuration and a manufacturing method of the battery module.

According to the battery module of the embodiment, an action direction of the pulling stress toward the restraint members is a same as a length direction of the restraint members, and there is no bending stress generated in the restraint members, and thus it is not necessary to use an expensive material for the restraint members, and the battery cell group can be restrained between the end plates by a simple and inexpensive configuration.

In the battery module recited in the embodiment, the restraint members may be arranged on two side surfaces of the battery cell group (for example, side surfaces 30a described later) and/or upper and lower surfaces of the battery cell group (for example, an upper surface 30b and a lower surface 30c described later).

According to the battery module of the embodiment, by arranging the restraint members on the two side surfaces of the battery cell group, the battery cell group can be restrained easily without being affected by electrode terminals or the like of the battery cells. In addition, by arranging the restraint members on the upper and lower surfaces of the battery cell group, a restraint distance of the end plates (a distance between coupling portions with the upper restraint member and the lower restraint member) can be shortened, and deflection of the end plates themselves can be suppressed.

In the battery module in the embodiment, the restraint members may be configured by sheet metal members or wire springs.

According to the battery module of the embodiment, the restraint members can be formed easily by sheet metal members. In addition, further weight reduction of the battery module is achieved by configuring the restraint members using wire springs.

In the battery module in the embodiment, the grappling structures may be configured by grappling portions (for example, grappling hole portions 52 and grappling portions 52B described later) disposed on two end portions of the restraint member, and hook portions (for example, hook portions 44 described later) which are disposed corresponding to the grappling portions on the end plates and are inserted through the grappling portions to be grappled.

According to the battery module of the embodiment, the grappling structures can be formed easily by the hook portions and the grappling portions being inserted through the hook portions.

In the battery module in the embodiment, inner side surfaces of the hook portions (for example, inner side surfaces 44b described later) may be concave surfaces, and abutment portions of the grappling portions (for example, tip end side periphery portions 522a described later), which are grappled to the hook portions and abut against the inner side surfaces, may have an R-shape curved in the same direction as a curving direction of the inner side surfaces, or a shape chamfered in the same direction as the curving direction of the inner side surfaces.

According to the battery module of the embodiment, when the end plates are deflected and deformed outward along with the expansion of the battery cells, the inner side surfaces of the hook portions and abutment surfaces of the grappling portions of the restraint members slide smoothly, and thereby stress concentration toward the abutment portions can be prevented and the deflection of the restraint members can be avoided.

In the battery module recited in the embodiment, the end plates may at least have inner metal plate layers (for example, inner metal plate layers 41 described later) arranged on a side close to the battery cells, outer metal plate layers (for example, outer metal plate layers 43) arranged on a side away from the battery cells, and resin plate layers (for example, resin plate layers 42 described later) arranged between the inner metal plate layers and the outer metal plate layers and having a thickness greater than thicknesses of the inner metal plate layers and the outer metal plate layers; the hook portions may be disposed on the outer metal plate layers; and the two end portions in a width direction and/or a height direction of the outer metal plate layers (for example, end portions 43a, 43b described later) may make the hook portions be arranged closer to the inner metal plate layers than outer end surfaces of the end plates (for example, outer end surface 40 described later) by being bent toward the inner metal plate layers.

According to the battery module of the embodiment, the hook portions can be easily formed integrally with the end plates by bending the outer metal plate layers. Moreover, in the end plate, the hook portions can be arranged on an inner side (a side of the battery cell group) corresponding to the thicknesses of the resin plate layers, and thus an protrusion amount of the hook portion or the restraint members protruding outward in a length direction of the battery module can be suppressed, and miniaturization of the battery module can be achieved.

In the battery module recited in the embodiment, the inner metal plate layers may have support plate portions (for example, support plate portions 45 described later) which are arranged to be capable of supporting inner end portions (for example, inner end portions 44a described later) on the side of the battery cell group in the hook portions.

According to the battery module of the embodiment, when the hook portions are displaced to the side of the battery cell group due to pulling stress, the support plate portions can support the hook portions by contacting with the hook portions, and thus excessive displacement of the hook portions to the side of the battery cell group can be suppressed.

According to the manufacturing method of battery module recited in the embodiment, the action direction of the pulling stress toward the restraint members can be made to be the same as the length direction of the restraint members, the restraint members can be held over the pair of end plates by the pulling stress without bending stress generated in the restraint members, and thus it is not necessary to use expensive steel plates for the restraint members, and the battery module in which the battery cell group can be restrained between the end plates with a simple and inexpensive configuration can be manufactured simply.

According to the disclosure, the battery module in which the battery cell group can be restrained between the end plates with a simple and inexpensive configuration and the manufacturing method of battery module can be provided.

In the following, embodiments of the disclosure are described specifically using drawings.

First Embodiment of Battery Module

Figure 2:
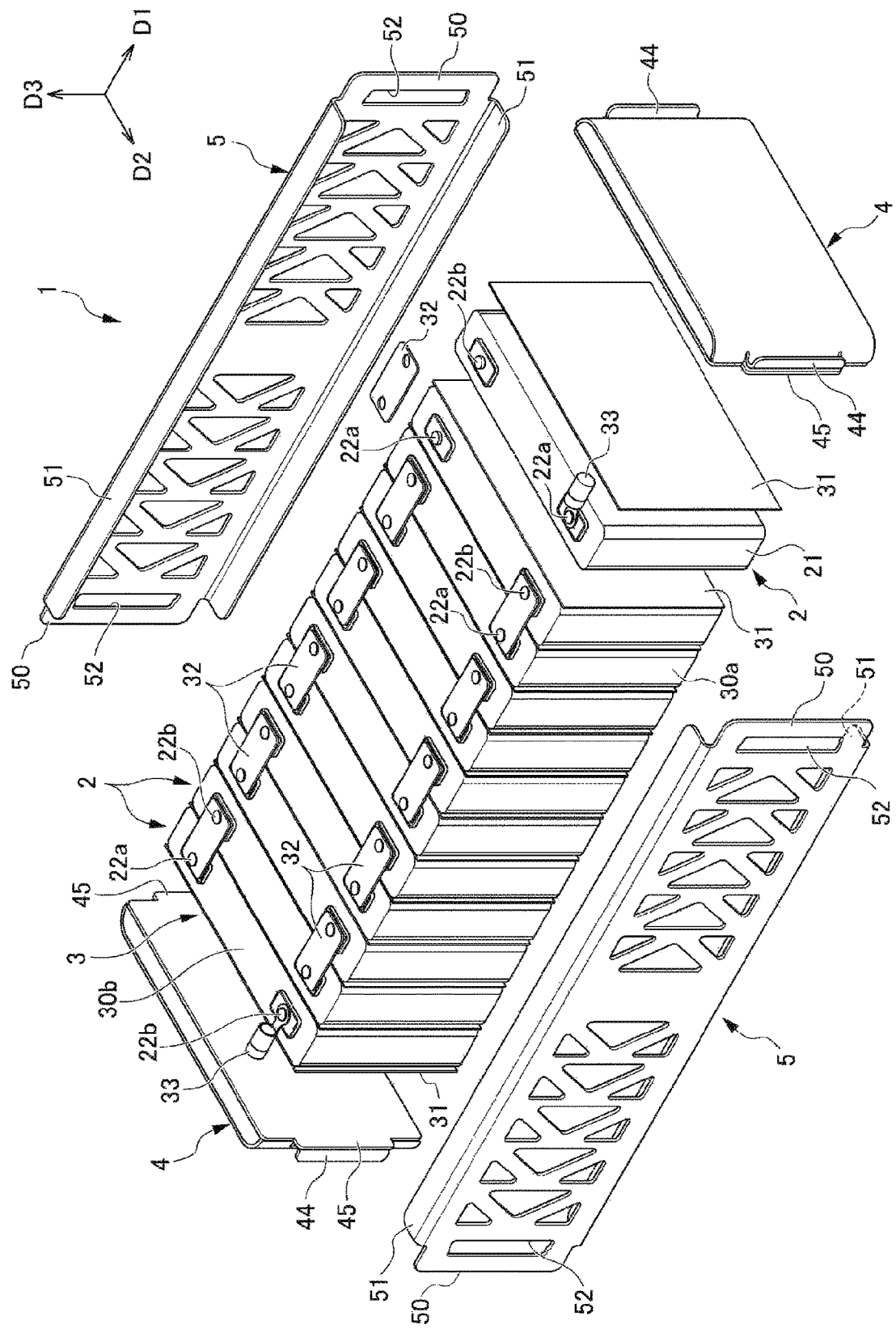
FIG. 2 is a perspective view in which one portion of the battery module shown in FIG. 1 is exploded and shown.

As shown in FIG. 1 and FIG. 2, a battery module 1 according to a first embodiment mainly has a battery cell group 3 configured by laminating a plurality of battery cells 2, a pair of end plates 4, and restraint members 5.

Furthermore, among directions shown in each drawing in the following, direction D1 is a direction along a lamination direction of the battery cells 2 and shows a length direction of the battery module 1, the battery cell group 3 and the restraint members 5. Direction D2 is a direction orthogonal to the lamination direction of the battery cells 2 and shows a width direction of the battery module 1, the battery cells 2, the battery cell group 3 and the end plates 4. Direction D3 is a direction orthogonal to the lamination direction of the plurality of battery cells 2 and shows a height direction of the battery module 1, the battery cells 2, the battery cell group 3 and the end plates 4. A direction shown by the direction D3 is an upward direction, and the opposite direction is a downward direction.

As shown in FIG. 2, the battery cells 2 are configured by accommodating electrode bodies (not shown) inside cell cases 21 being a substantially cuboid shape formed by aluminum or aluminum alloy for example. The battery cells 2 have a flat box shape in which a dimension in the height direction is shorter than a dimension in the width direction. On one surface of the battery cell 2, a positive terminal 22a and a negative terminal 22b are disposed in a protruding manner. A plurality of battery cells 2 is laminated along the direction D1 with the surfaces on which the positive terminals 22a and the negative terminals 22b are disposed in a protruding manner being directed upward. In this way, the battery cell group 3 is configured. Insulation plates 31 are respectively interposed between adjacent battery cells 2, 2, and insulation between the battery cells 2, 2 is achieved.

Arrangement of the positive terminals 22a and the negative terminals 22b of the battery cells 2, 2 adjacent in the lamination direction are different. That is, when the battery cell group 3 is viewed in the lamination direction of the battery cells 2, the positive terminals 22a and the negative terminals 22b of the battery cells 2 are arranged alternately. The positive terminals 22a and the negative terminals 22b of adjacent battery cells 2, 2 are electrically connected by plate-shaped bus bars 32. In this way, the entire battery cells 2 configuring the battery cell group 3 are connected in series. In the battery cells 2, 2 respectively arranged on two ends, harnesses 33, 33 for electrical connection to an external machine are respectively connected to the positive terminal 22a or the negative terminal 22b on which the bus bar 32 is not disposed. As for the harnesses 33 in the drawings, only end portions connected to the positive terminal 22a or the negative terminal 22b are shown. Furthermore, the electrical connection of the plurality of battery cells 2 by bus bars is not limited to series connection and may be parallel connection.

Figure 4:
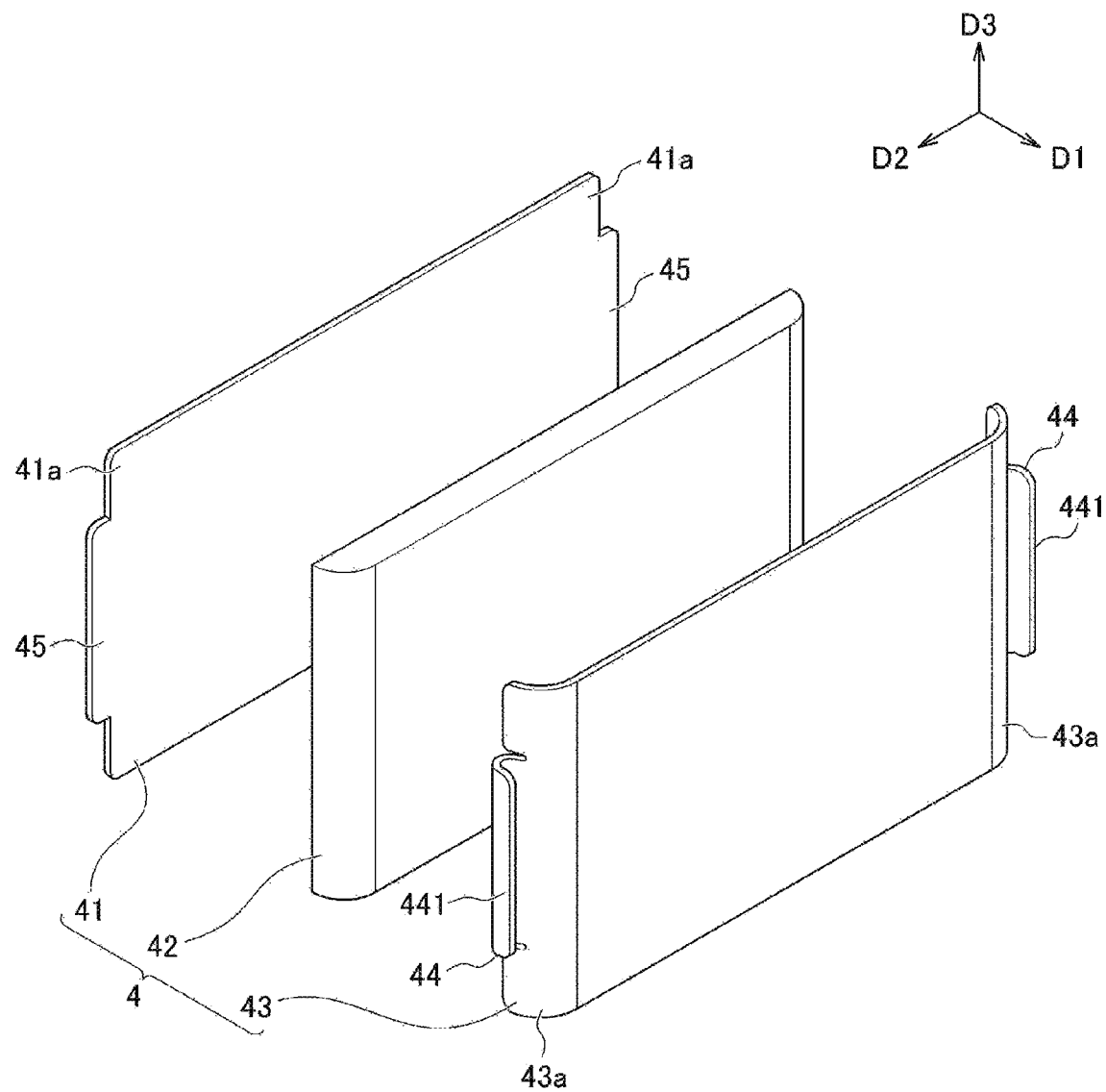
FIG. 4 is an exploded perspective view showing end plates of the battery module shown in FIG. 1.

The end plates 4 are formed, similar to the shape of the battery cells 2, into a horizontally long rectangular shape in which a width dimension is larger than a height dimension, and are respectively arranged on two end portions in the lamination direction of the battery cells 2. That is, a pair of end plates 4, 4 is laminated via the insulation plates 31 at the outside of the battery cells 2, 2 of two ends of the battery cell group 3 and clamps the battery cell group 3. As shown in FIG. 4, the end plate 4 shown in the embodiment has a three-layer structure in which an inner metal plate layer 41, a resin plate layer 42, and an outer metal plate layer 43 are laminated in order from a side close to the battery cells 2.

Both the inner metal plate layers 41 and the outer metal plate layers 43 are formed by a metal plate material such as iron, aluminum or the like. The resin plate layers 42 are arranged between the inner metal plate layers 41 and the outer metal plate layers 43 by a resin material such as polypropylene (PP), polystyrene (PS), polyphene sulfide (PPS), polybutylene terephthalate (PBT) or the like. The resin plate layers 42 are insert-molded and integrated between the inner metal plate layers 41 and the outer metal plate layers 43.

The resin plate layers 42 have a lower rigidity than metal, and thus thicknesses of the resin plate layers 42 are desired to be increased in order to improve strength and rigidity of the end plates 4. Therefore, for the end plates 4, the thicknesses of the resin plate layers 42 are greater than respective thickness of the inner metal plate layers 41 and the outer metal plate layers 43. A specific thickness of each of the layers 41, 42, 43 is not limited at all, for example, the inner metal plate layers 41 can be 2 mm, the resin plate layers 42 can be 14 mm, and the outer metal plate layers 43 can be 2 mm in thickness.

The end plates 4 having such configurations have, between the inner metal plate layers 41 and the outer metal plate layers 43, the resin plate layers 42 thicker than the inner metal plate layers 41 and the outer metal plate layers 43, and thus moment of inertia of area can be increased without increasing the thicknesses of the inner metal plate layers 41 and the outer metal plate layers 43. On the other hand, the resin plate layers 42 have a lower density than the inner metal plate layers 41 and the outer metal plate layers 43, and thus the end plates 4 are reduced in weight even in the three-layer structures. Therefore, the end plates 4 are lightweight while having high strength and rigidity.

In order to improve adhesion forces between the inner metal plate layers 41 and the resin plate layers 42 and between the outer metal plate layers 43 and the resin plate layers 42, according to an embodiment, the inner metal plate layers 41 and the outer metal plate layers 43 are respectively subjected to a roughening treatment, or a metal-resin bonding film treatment which chemically bonds metal and resin on surfaces in contact with the resin plate layers 42. By the roughening treatment, the resin material inserted between the inner metal plate layers 41 and the outer metal plate layers 43 adheres, by a so-called anchor effect, to bite into each surface of the inner metal plate layers 41 and the outer metal plate layers 43. Therefore, strength in a slipping direction between each layer of the end plates 4 is improved, and the strength and the rigidity of the end plates 4 are further improved. In addition, by the metal-resin bonding film treatment, bonding films chemically bonds the metal and the resin, and thus an effect the same as the roughening treatment can be obtained.

A specific way of the roughening treatment is not particularly limited, and a well-known treatment capable of forming nanometer-scale ruggedness on the surfaces in contact with the resin plate layers 42 can be used. A roughening treatment by solution immersion of a ruggedness forming solution (for example, a chemical etching solution such as hydrohalic acid such as hydrochloric acid, sulfurous acid, sulfuric acid), and a mechanical roughening treatment by sand blasting or the like are exemplified. In addition, a specific way of the metal-resin bonding film treatment is not particularly limited, and a well-known treatment capable of forming nanometer-scale coating films having high chemical reactivity on both the metal and the resin at least on the surfaces in contact with the resin plate layers 42 can be used. For example, a solution treatment using triazine thiol or the like is exemplified.

Figure 7:
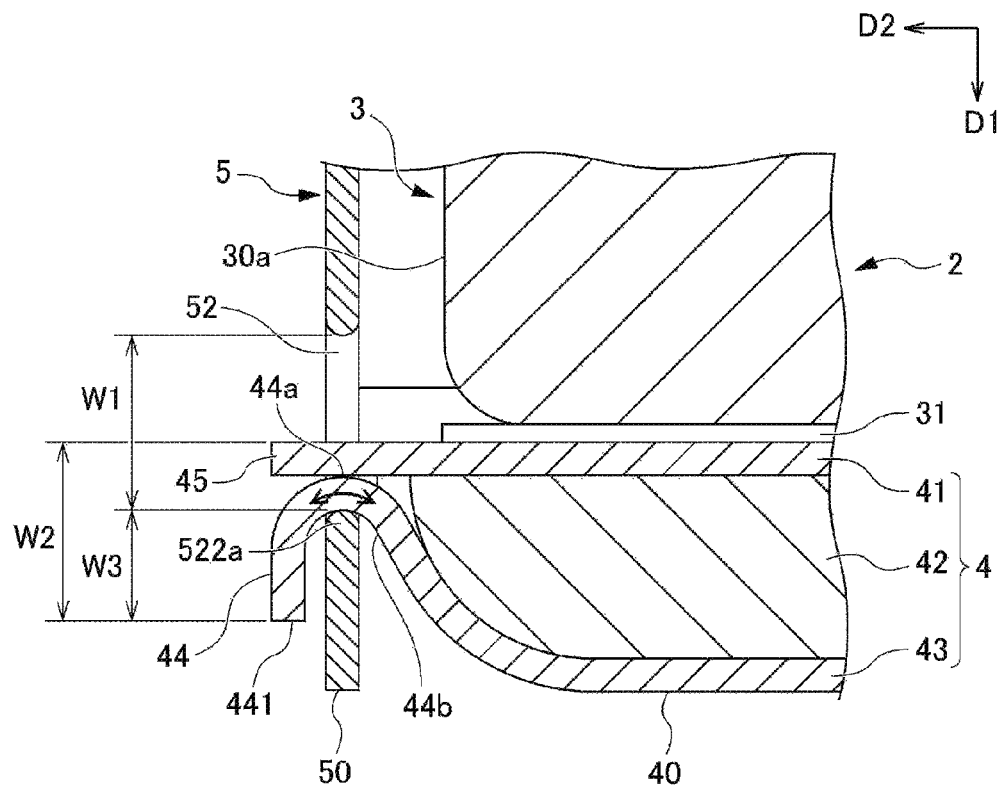
FIG. 7 is a cross-section view in which the grappling structure of the end plates and the restraint members in the battery module shown in FIG. 1 is enlarged and shown.

The end plates 4 have hook portions 44 on two end portions in the width direction. The hook portions 44 are formed by bending metal plate parts projected in a rectangular shape from center parts of the height direction of two end portions 43a, 43a of the outer metal plate layers 43 in the width direction. Specifically, the hook portions 44 are formed by folding their tip end sides back toward a direction opposite to the battery cell group 3 after respectively bending the metal plate parts toward the inner metal plate layers 41. As shown in FIG. 7, tip end portions 441 of the hook portions 44 folded back toward the direction opposite to the battery cell group 3 extend from inner end portions 44a of the hook portions 44 arranged closest to the side of the battery cell group 3 toward the direction opposite to the battery cell group 3. In this way, the hook portions 44 are formed in a substantially U shape in a plan view opened in the direction opposite to the battery cell group 3.

Generally, end plates are formed thick in consideration of load resistance when battery cells expand. Therefore, it is hard to form hook portions integrally. However, according to the end plates 4 shown in the embodiment, because of the three-layer structures as described above, the hook portions 44 integrated to the end plates 4 can be formed easily by bending the outer metal plate layers 43 configuring the end plates 4.

Figure 3:
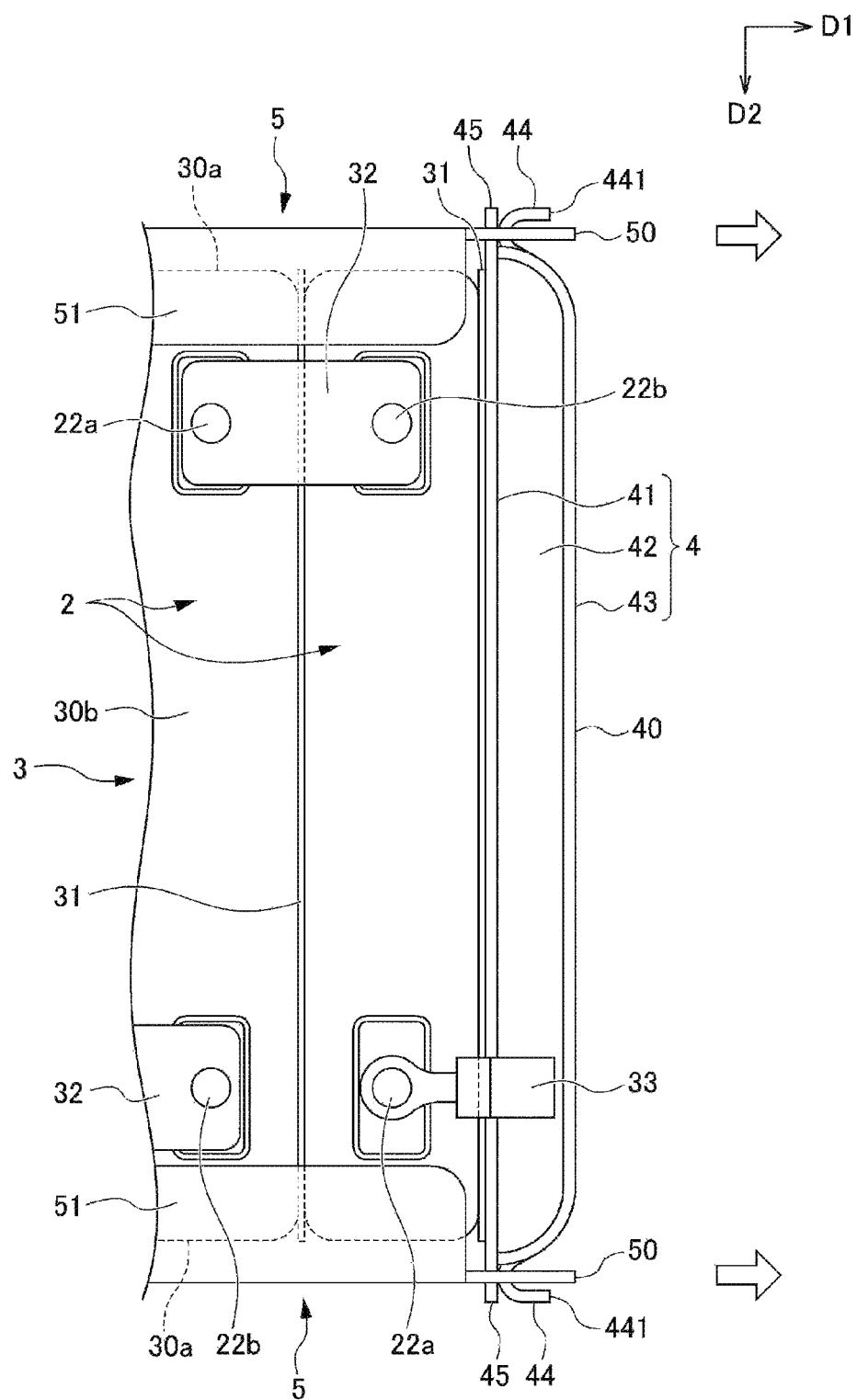
FIG. 3 is a plan view showing one end portion of the battery module shown in FIG. 1.
Figure 5:
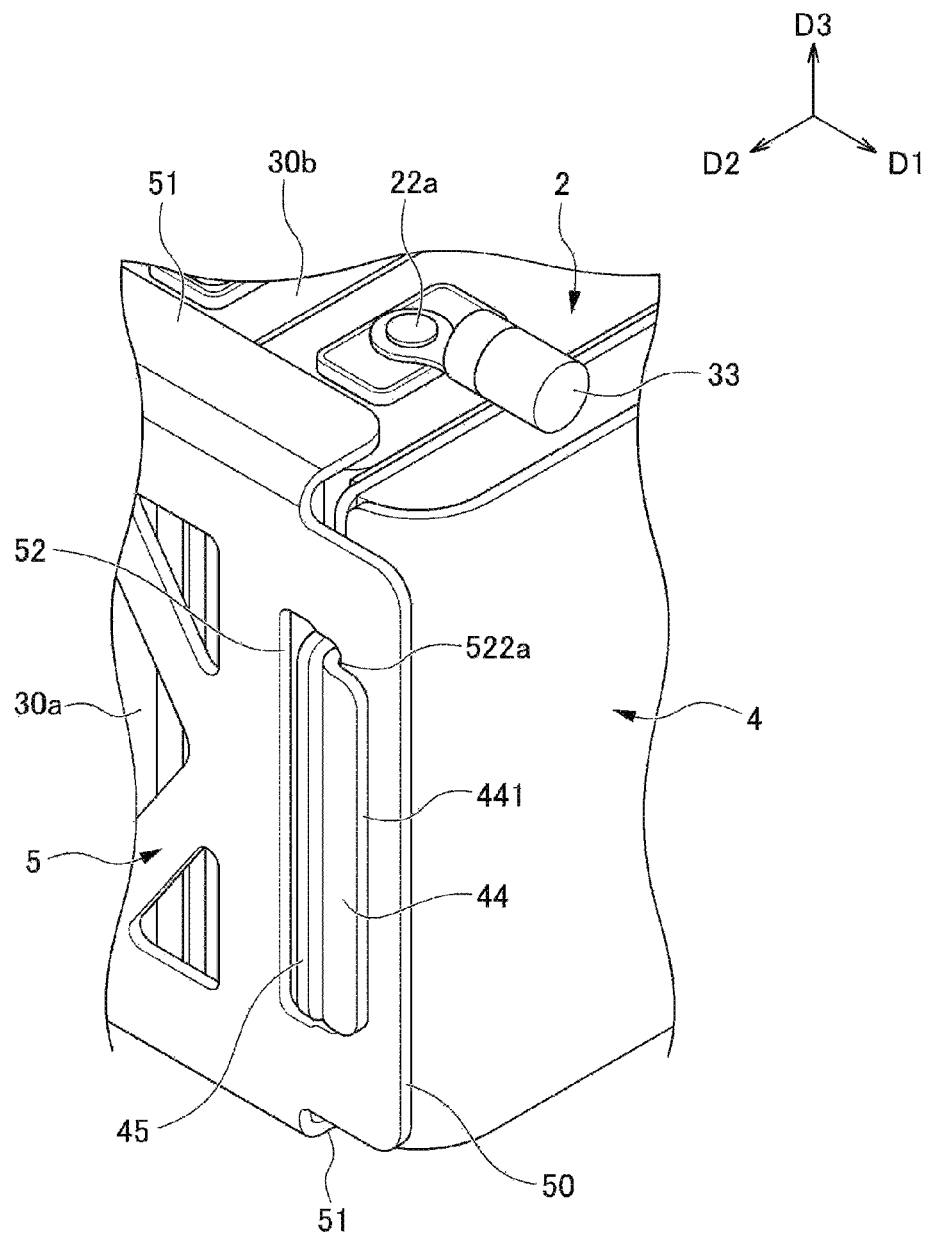
FIG. 5 is a perspective view in which a grappling structure of the end plates and restraint members in the battery module shown in FIG. 1 is enlarged and shown.
Figure 6:
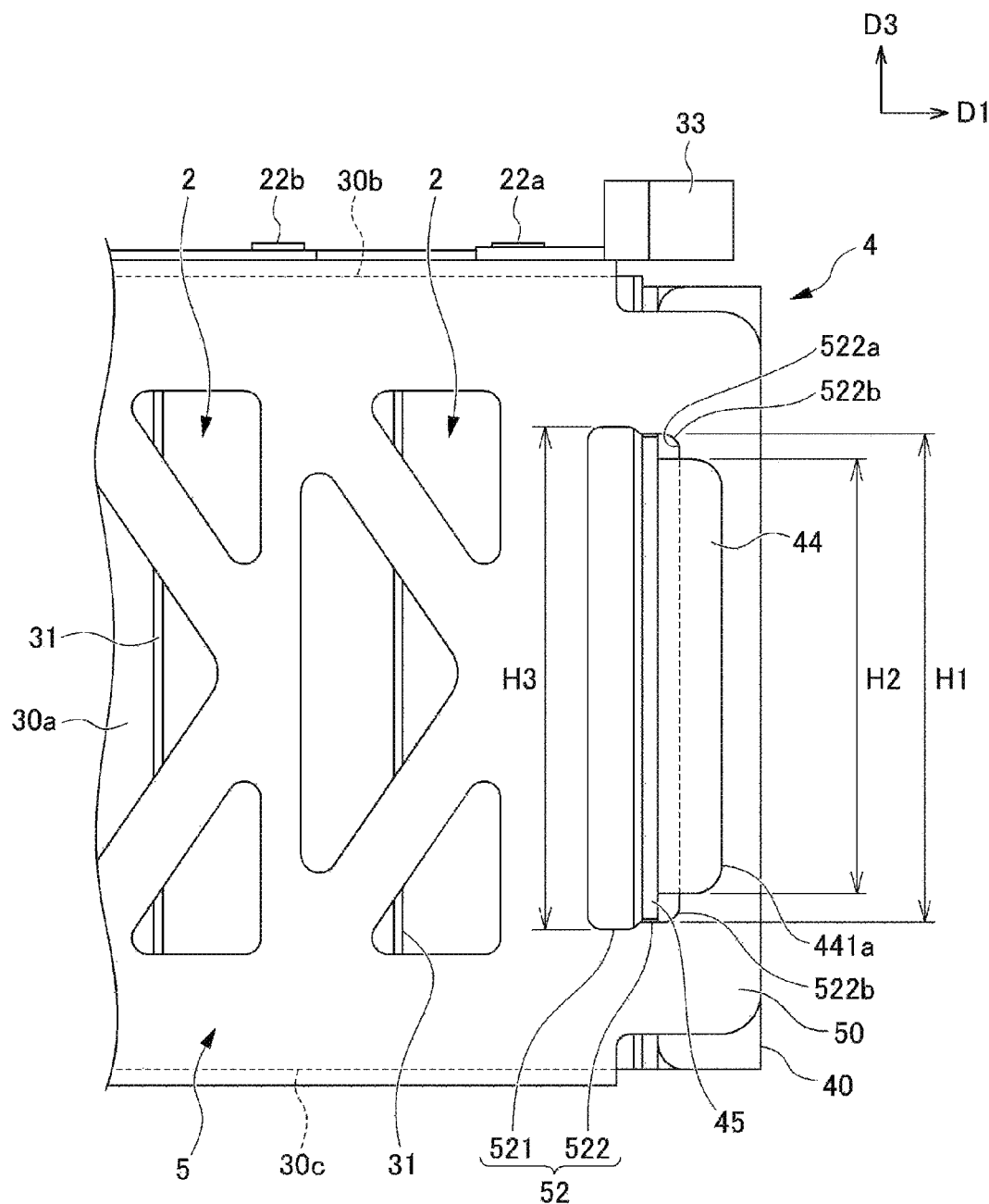
FIG. 6 is a side view in which the grappling structure of the end plates and restraint members in the battery module shown in FIG. 1 is enlarged and shown.

As shown in FIG. 3, a pair of hook portions 44, 44 of the end plates 4 is respectively arranged at positions stretching outward in the width direction beyond the battery cell group 3. In addition, the hook portions 44 are formed by the metal plate parts projected from one part in the height direction of the outer metal plate layers 43, and thus as shown in FIG. 5 and FIG. 6, height dimensions of the hook portions 44 are sufficiently shorter than height dimensions of the battery cell group 3 and the end plates 4. Furthermore, two end portions 43*a*, 43*a* of the outer metal plate layers 43 other than the hook portions 44 are gently curved and bent toward the inner metal plate layers 41. The bent tip ends are in contact with or close to the inner metal plate layers 41 but are not fixed to the inner metal plate layers 41.

As shown in FIG. 4, two end portions 41*a*, 41*a* in the width direction of the inner metal plate layers 41 respectively have support plate portions 45, 45 at positions corresponding to the hook portions 44, 44. The support plate portions 45 are formed by the metal plate parts projected in a rectangular shape in the width direction from center parts in the height direction in the two end portions 41*a*, 41*a* of the inner metal plate layers 41. As shown in FIG. 6, height dimensions H1 of the support plate portions 45 are slightly greater than height dimensions H2 of the hook portions 44. In addition, as shown in FIG. 3 and FIG. 7, a projecting amount of the support plate portions 45 outward the width direction of the end plates 4 is substantially the same as a projecting amount toward the same direction of the hook portions 44.

As shown in FIG. 7, the support plate portions 45 are arranged in contact with or close to the inner end portions 44*a* on the side of the battery cell group 3 in the hook portions 44. In this way, when the hook portions 44 are displaced toward the side of the battery cell group 3, the support plate portions 45 abut against the inner end portions 44*a* of the hook portions 44 to support the hook portions 44, and suppress excessive displacement of the hook portions 44. In addition, the support plate portions 45 are not fixed with respect to the hook portions 44, and thus there is no risk that when the end plates 4 are deflected and deformed due to expansion of the battery cells 2, unreasonable stress is applied between the inner metal plate layers 41 and the outer metal plate layers 43.

The restraint members 5 are respectively arranged on two side surfaces 30*a*, 30*a* of the battery cell group 3. The restraint members 5 are made of sheet metal members being a substantially rectangular shape in a side view and longer than a length of the battery cell group 3. Two end portions 50, 50 of the restraint members 5 along the lamination direction of the battery cells 2 stretch outward in the length direction beyond the battery cell group 3 and extend straight until the end plates 4. Upper ends and lower ends of the restraint members 5 have bending portions 51, 51 respectively bent toward an upper surface 30*b* and a lower surface 30*c* of the battery cell group 3 and suppress deflection in the length direction. A pair of restraint members 5, 5 is arranged to grip the two side surfaces 30*a*, 30*a* of the battery cell group 3 in a vertical direction by the bending portions 51, 51, and clamp the battery cell group 3 and the pair of end plates 4, 4 from the width direction.

On the two end portions 50, 50 of the restraint members 5 stretching out from the battery cell group 3, grappling hole portions 52, 52 are respectively disposed. The grappling hole portions 52 corresponds to "grappling portions" of the disclosure. As shown in FIG. 5 and FIG. 6, the grappling hole portions 52 have sizes sufficient for the hook portions 44 and the support plate portions 45 of the end plates 4 to be inserted through.

As shown in FIG. 6, the grappling hole portions 52 are configured by first hole portions 521 and second hole portions 522. The first hole portions 521 are formed into a vertically elongated substantially rectangular shape and have height dimensions H3 slightly greater than the height dimensions H1 of the support plate portions 45. The second hole portion 522 are formed into a vertically elongated substantially rectangular shape and have height dimensions almost the same as the height dimensions H1 of the support plate portions 45. The second hole portions 522 are arranged closer to the tip end sides of the restraint members 5 (a right end side in FIG. 6) than the first hole portions 521. One grappling hole portion 52 is formed by integrally bonding the first hole portions 521 and the second hole portions 522. In addition, as shown in FIG. 7, width dimensions W1 of the grappling hole portions 52 are greater than dimensions W2 from combining the inner metal plate layers 41 of the end plates 4 and the tip end portion 441 of the hook portions 44. As shown in FIG. 6, peripheral edges of the grappling hole portions 52 have a smooth R-shape.

The hook portions 44 and the support plate portions 45 of the end plates 4 are inserted through the grappling hole portions 52 and arranged in the second hole portions 522. The battery cell group 3 between a pair of end plates 4, 4 is compressed in the lamination direction by predetermined loads, and the detail is described later in the description of the manufacturing method of the battery module 1. Therefore, loads to opposite directions (directions in which the pair of end plates 4, 4 are separated) are applied to the pair of end plates 4, 4 by a restoration force restoring the compressed battery cell group 3 to the original state. The pair of end plates 4, 4 moves to opposite directions due to the loads, along with this, the hook portions 44 inside the grappling hole portions 52 move toward the second hole portions 522. In this way, the hook portions 44 abut against tip end side periphery portions 522*a* extending in a longitudinal direction of the second hole portions 522, and grapple the tip end side periphery portions 522*a* to couple the end plates 4 and the restraint members 5.

The pair of end plates 4, 4 coupling the restraint members 5 makes, by the restoration force of the battery cell group 3, pulling forces to opposite directions in the length direction of the restraint members 5 always act on the restraint members 5 via the hook portions 44, 44. Besides, if the battery cells 2 expand due to charge and discharge or deterioration of the battery cells 2, the battery cell group 3 extends in the length direction and further presses the pair of end plates 4, 4 in opposite directions. In this way, the pair of end plates 4, 4 pulls the two end portions 50, 50 of the restraint members 5 in opposite directions via the hook portions 44 and the grappling hole portions 52.

Stress acting on the two end portions 50, 50 of the restraint members 5 at this time is only pulling stress caused by being pulled by the hook portions 44. The pulling stress acts, as shown by hollow arrows in FIG. 3, on the two end portions 50, 50 of the restraint members 5 in a straight line along the length direction of the restraint members 5. That is, an action direction of the pulling stress to the two end portions 50, 50 of the restraint members 5 by the hook portions 44 and the length direction of the restraint members 5 are the same direction. Therefore, bending stress which forcibly deforms the restraint members 5 is not generated in the restraint members 5. Therefore, for the restraint members 5, it is not necessary to use expensive high-strength spring steel, and ordinary inexpensive steel plates can be used. Accordingly, the battery module 1 can restrain the battery cell group 3 between the pair of end plates 4, 4 with an inexpensive configuration. In addition, the battery module 1 can restrain the battery cell group 3 with simple grappling structures of the hook portions 44 and the grappling hole portions 52, and thus it is not necessary to fasten the end plates 4 and the restraint members 5 by bolts, and simplification and weight reduction of the structures can be achieved.

Because the end plates 4 shown in the embodiment are three-layer structures, the hook portions 44 can be arranged leaning to an inner side (the side of the battery cell group 3) corresponding to the thicknesses of the resin plate layers 42. Therefore, a protrusion amount of the hook portions 44 and the restraint members 5 protruding outward in the length direction of the battery module 1 can be suppressed, and miniaturization of the battery module 1 can be achieved. That is, as shown in FIG. 3, FIG. 6 and FIG. 7, the end portions 50 closer to the tip end sides than the grappling hole portions 52 of the restraint members 5 are arranged so as not to protrude outward beyond outer end surfaces 40 of the end plates 4 (outermost surfaces of the outer metal plate layers 43). In addition, the tip end portions 441 of the hook portions 44 are also arranged so as not to protrude outward beyond the outer end surface 40 of the end plates 4.

Furthermore, the tip end portions 441 of the hook portions 44 do not protrude outward beyond the outer end surfaces 40 of the end plates 4, but as shown in FIG. 7, the tip end portions 441 are folded back from the inner end portions 44a of the hook portions 44 and extend sufficiently long in the direction opposite to the battery cell group 3. Therefore, the tip end side periphery portions 522a are arranged deep in the hook portions 44. Length dimensions W3 of the tip end portions 441 are much greater than curvature radiuses of end surfaces of the tip end side periphery portions 522a. In this way, the hook portions 44 and the grappling hole portions 52 are unlikely to come off, and the hook portions 44 can be prevented from coming off from the grappling hole portions 52 when collision loads in the width direction act on the end plates 4.

As shown in FIG. 7, inner side surfaces 44b of the hook portions 44 against which the tip end side periphery portions 522a abut are concave surfaces smoothly curved in an arc shape along the width direction of the end plates 4. On the other hand, the tip end side periphery portions 522a, which are abutment portions with the inner side surfaces 44b, have an R-shape being round so as to be curved in the same direction as the curving direction of the inner side surfaces 44b. Therefore, the inner side surfaces 44b of the hook portions 44 and the tip end side periphery portions 522a of the restraint members 5 come into contact with each other at curved surfaces.

Here, if the end plates 4 are deflected and deformed to be curved outward because great loads are applied to the end plates 4 along with the expansion of the battery cells 2, the inner side surfaces 44b of the hook portions 44 slide, as shown by an arrow in FIG. 7, with respect to the tip end side periphery portions 522a while rotating along the concave surfaces. At this time, because the tip end side periphery portions 522a are also R-shape, the inner side surfaces 44b of the hook portions 44 can smoothly slide along end surfaces of the tip end side periphery portions 522a. Therefore, unreasonable stress concentration to the tip end side periphery portions 522a can be prevented, and there is no risk that the bending stress which causes deformation acts on the tip end side periphery portions 522a. Furthermore, the tip end side periphery portions 522a may also have a shape chamfered in the same direction as the curving direction of the inner side surfaces 44b.

[Manufacturing Method of Battery Module]

Figure 8:
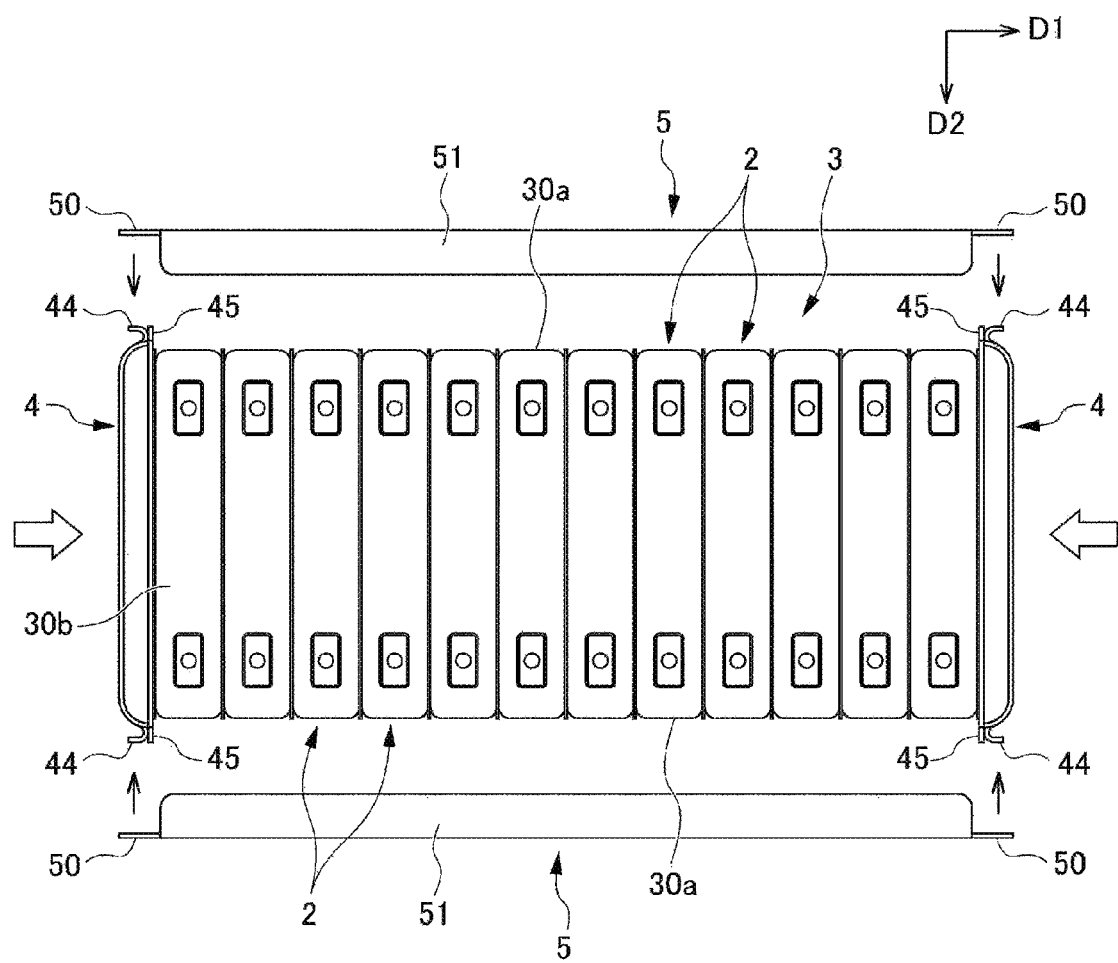
FIG. 8 is an illustration diagram illustrating a manufacturing method of the battery module shown in FIG. 1.

In the following, a manufacturing method of the battery module 1 is described. First, as shown in FIG. 8, the battery cell group 3 is configured by laminating a plurality of battery cells 2 with the insulation plates 31 sandwiched between adjacent battery cells 2, 2. Furthermore, on the two end portions of the battery cell group 3 along the lamination direction of the battery cells 2, the end plates 4, 4 having the hook portions 44 are respectively arranged with the insulation plates 31 being sandwiched. The battery cell group 3 is clamped by the pair of end plates 4, 4. A state of the battery cell group 3 at this time is a state (an initial lamination state) in which loads are not substantially applied from the outside and the plurality of battery cells 2 is only simply laminated and arranged.

Next, as shown by hollow arrows in FIG. 8, the pair of end plates 4, 4 in the initial lamination state are pressed using a pressing device not shown in the drawings with predetermined loads in a direction in which the pair of end plates 4, 4 get close to each other. In this way, a compression force is applied to the battery cell group 3, and the battery cell group 3 is in a state in which the length dimension is reduced (a compression state). By setting the battery cell group 3 to the compression state, a separation distance between the pair of end plates 4, 4 is shortened from the initial lamination state. Furthermore, the load applied to the battery cell group 3 at this time and the dimension reduced due to the load are an allowable crushing load and an allowable crushing dimension to an extent that performances of the battery cells 2 are not damaged.

Figure 9:
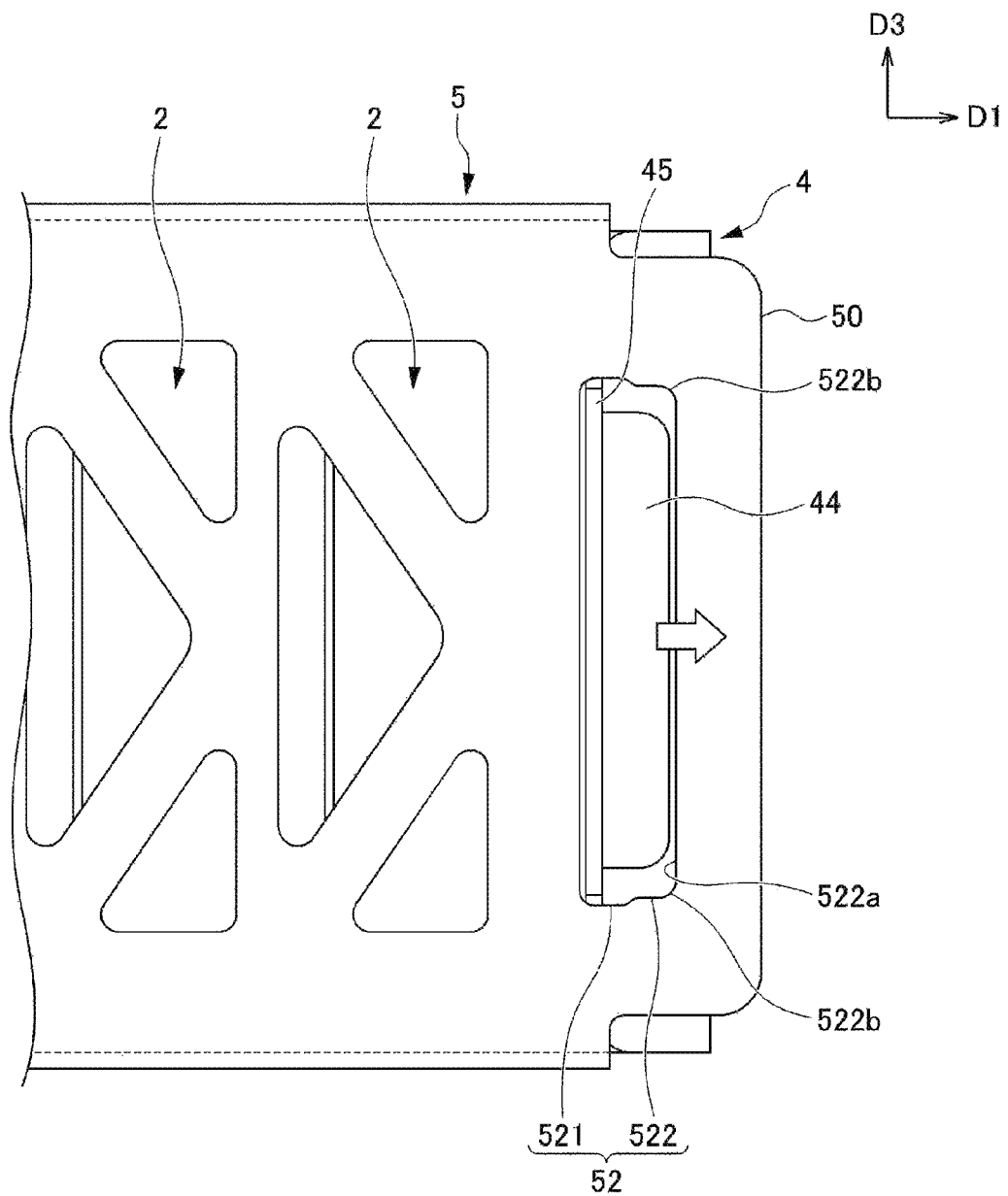
FIG. 9 is an illustration diagram illustrating a manufacturing method of the battery module shown in FIG. 1.

Here, the grappling hole portions 52, 52 of the restraint members 5 are disposed corresponding to positions of the hook portions 44, 44 and the support plate portions 45, 45 of the pair of end plates 4, 4 when the battery cell group 3 is in the compression state. Specifically, if the restraint members 5 are arranged on the side surfaces 30a of the battery cell group 3 in the compression state, as shown in FIG. 9, the support plate portions 45 of the end plates 4 are arranged in the first hole portions 521 of the grappling hole portions 52, and the hook portions 44 and the support plate portions 45 can be inserted through the grappling hole portions 52. Therefore, after the battery cell group 3 is in the compression state, the restraint members 5, 5 are arranged on the two side surfaces 30a, 30a of the battery cell group 3, and a hook portion 44 and a support plate portion 45 of each end plate 4 are inserted through each grappling hole portion 52 of the restraint members 5.

After the hook portions 44 and the support plate portions 45 of the end plates 4 are accommodated in the grappling hole portions 52, the compression force to the battery cell group 3 is released. By releasing the compression force, the restoration force for returning to an original initial lamination state is generated in the battery cell group 3 (the battery cells 2), and the battery cell group 3 extends in the length direction toward the original initial lamination state. Along with this, the pair of end plates 4, 4 moves outward oppositely to enlarge the separation distance. As the end plates 4 move outward, the hook portions 44 inside the grappling hole portions 52 move, as shown by a hollow arrow in FIG. 9, toward the second hole portions 522, and the inner side surfaces 44b of the hook portions 44 abut against the tip end side periphery portions 522a of the second hole portions 522 and are in a state shown in FIG. 6 in which the grappling hole portions 52 are grappled by the hook portions 44. At this time, the support plate portions 45 cannot move to positions of corner portions 522b, 522b of second hole portion 522 and are thus arranged inside the second hole portions 522 on a front side of the corner portions 522b, 522b (a side of the battery cell group 3). Because the height dimensions H1 of the support plate portions 45 are approximately equal to the height dimensions of the second hole portions 522, the support plate portions 45 are accommodated inside the second hole portions 522 in a state that the position of the height direction is determined.

When the inner side surfaces 44b of the hook portions 44 abut against the tip end side periphery portions 522a of the second hole portions 522, the battery cell group 3 is in a state before completely returning from the compression state to the initial lamination state. Therefore, the battery cell group 3 further extends toward the original initial lamination state, and thus the pulling force along the length direction of the restraint members 5 acts on the tip end side periphery portions 522a via the hook portions 44. Therefore, the two end portions 50, 50 of the restraint members 5 are pulled by the hook portions 44, 44 in opposite directions along the length direction of the restraint members 5. In this way, the restraint members 5 are grappled by the hook portions 44 of the end plates 4 and coupled to the end plates 4, restraining the battery cell group 3 inside the pair of end plates 4, 4. Thereafter, the bus bars 32, the harnesses 33 and the like are connected to the positive terminals 22a and the negative terminals 22b of the battery cell group 3.

The manufacturing method can restrain the battery cell group 3 with the grappling structures of the hook portions 44 and the grappling hole portions 52, and thus it is not necessary to perform bolt fastening to restrain the battery cell group 3. Therefore, according to the manufacturing method, the battery module 1 shown in FIG. 1 in which the battery cell group 3 is restrained by the pair of end plates 4, 4 and the pair of restraint members 5, 5 can be manufactured easily.

Second Embodiment of Battery Module

Figure 10:
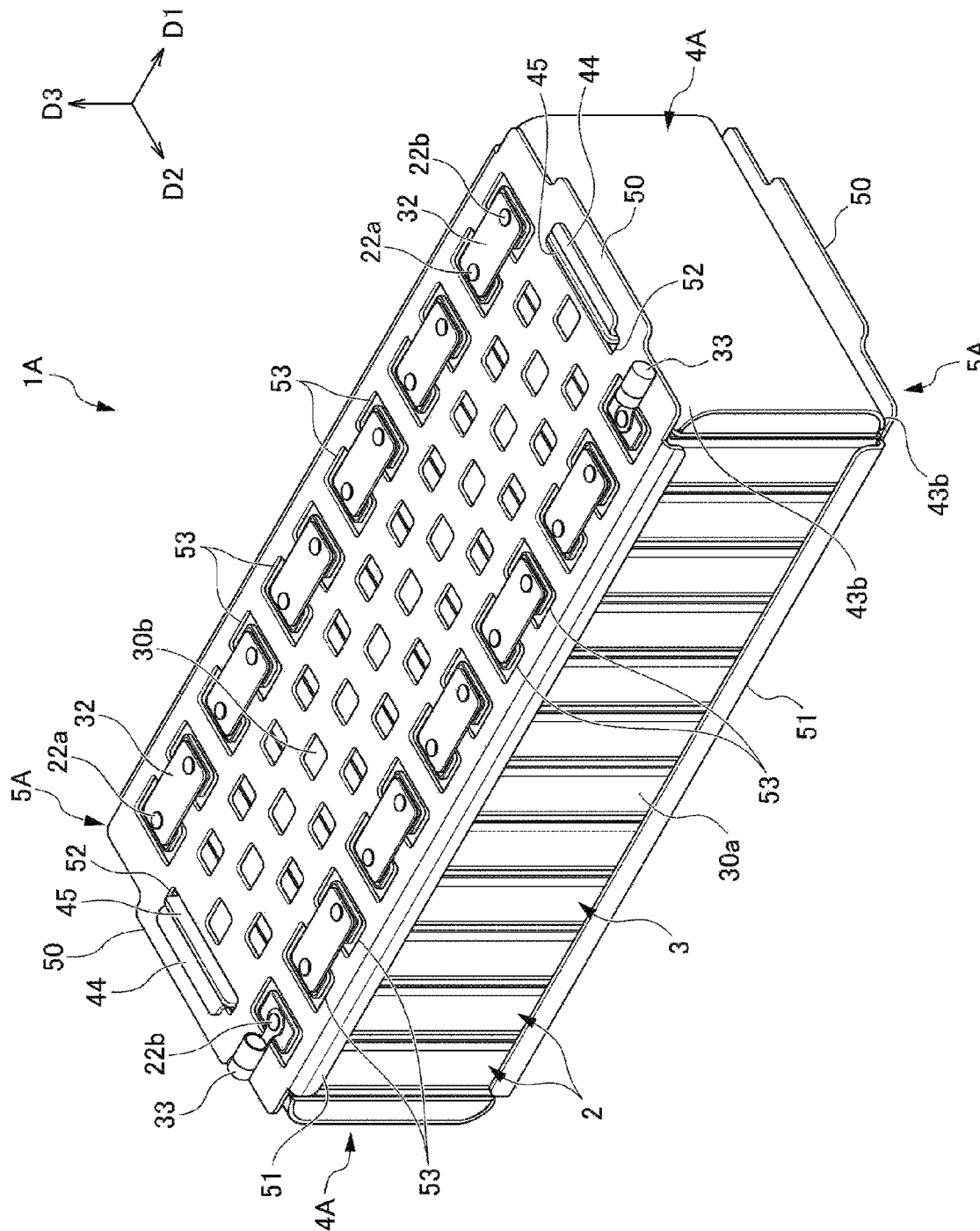
FIG. 10 is an overall perspective view showing another embodiment of the battery module according to the disclosure.
Figure 11:
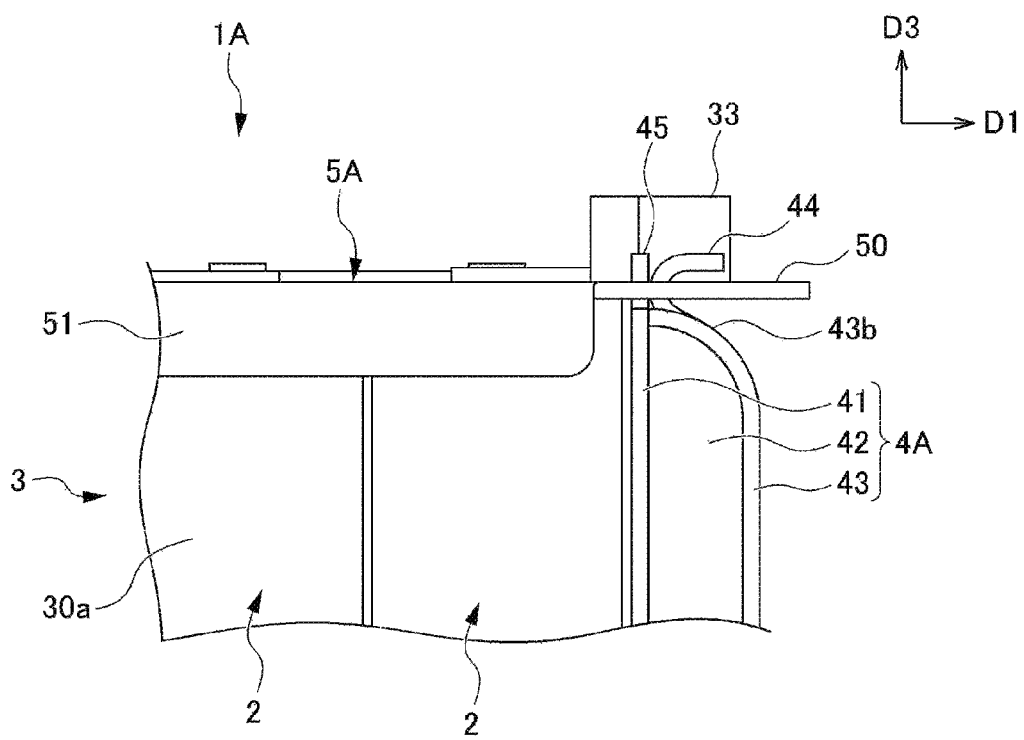
FIG. 11 is a side view in which a grappling structure of end plates and restraint members in the battery module shown in FIG. 10 is enlarged and shown.

In FIG. 10 and FIG. 11, a second embodiment of the battery module according to the disclosure is shown. Sites with the same symbols as the battery module 1 according to the first embodiment shown in FIG. 1 and FIG. 2 are sites with the same configurations, and thus the aforementioned description is used as specific description of those sites and is omitted here.

A battery module 1A according to a second embodiment is different from the battery module 1 according to the first embodiment in that the battery module 1A has hook portions 44, 44 on two end portions in a height direction of end plates 4A, and that restraint members 5A, 5A are arranged on an upper surface 30b and a lower surface 30c of the battery cell group 3. That is, the end plates 4A shown in the embodiment have configurations in which the width direction of the end plates 4 shown in FIG. 4 is set as the height direction and the end plates 4A have a horizontally long rectangular shape in accordance with a shape of battery cells 2. Therefore, the hook portions 44, 44 and support plate portions 45, 45 are arranged on two end portions in the height direction of the end plates 4A (two end portions 43b, 43b in a height direction of outer metal plate layers 43).

On the other hand, the restraint members 5A are made of sheet metal members being an elongated substantially rectangular shape in a plan view and extending straight along a length direction of the battery cell group 3. In order to make width dimensions of the restraint members 5A corresponding to a width dimension of the battery cell group 3, the restraint members 5A are formed wider than the restraint members 5. Therefore, a pair of restraint members 5A, 5A is arranged to grip, by bending portions 51, 51 of two end in a width direction, the battery cell group 3 from the width direction, and clamp the battery cell group 3 and a pair of end plates 4A, 4A from a vertical direction.

Furthermore, a plurality of terminal penetrating holes 53 which penetrates positive terminals 22a and negative terminals 22b respectively is disposed corresponding to positions of the positive terminals 22a and the negative terminals 22b of respective battery cells 2 at least on the restraint members 5A arranged on the upper surface 30b of the battery cell group 3. Bus bars 32 and harnesses 33 are electrically connected to the positive terminals 22a and the negative terminals 22b exposed from the terminal penetrating holes 53 of the restraint members 5A.

Similar to the battery module 1 according to the first embodiment, the battery module 1A according to the second embodiment is also configured by grappling the grappling hole portions 52 of the restraint members 5A by each of the hook portions 44, 44 of the end plates 4A to restraining the battery cell group 3. Therefore, an effect the same as the battery module 1 according to the first embodiment is obtained. Moreover, the hook portions 44 of the end plate 4A grapple the restraint members 5A on long sides, and thus compared with a case when the restraint members 5 are grappled on short sides as in the end plates 4 of the first embodiment, restraint distances of the end plates 4A (distances between upper and lower hook portions 44, 44) can be shortened. The end plates 4A are deflected and deformed along a lateral direction (a vertical direction) during expansion of the battery cell group 3, and thus compared with a case when the end plates 4A are deflected and deformed along a longitudinal direction (a width direction), the deflection of the end plates 4A themselves can be suppressed. Since the deflection of the end plates 4A is suppressed, the deflection of the battery cells 2 is also suppressed, and thus loads on the weld portions of the cell cases 21 can be reduced, and reliability of the battery cells 2 is improved. In addition, in the battery module 1A, the two side surfaces 30a, 30a of the battery cell group 3 can be set to an open state, and thus it also becomes easy to take a heat dissipation measure or a cooling measure of the battery cells 2 using the two side surfaces 30a, 30a.

Third Embodiment of Battery Module

Figure 12:
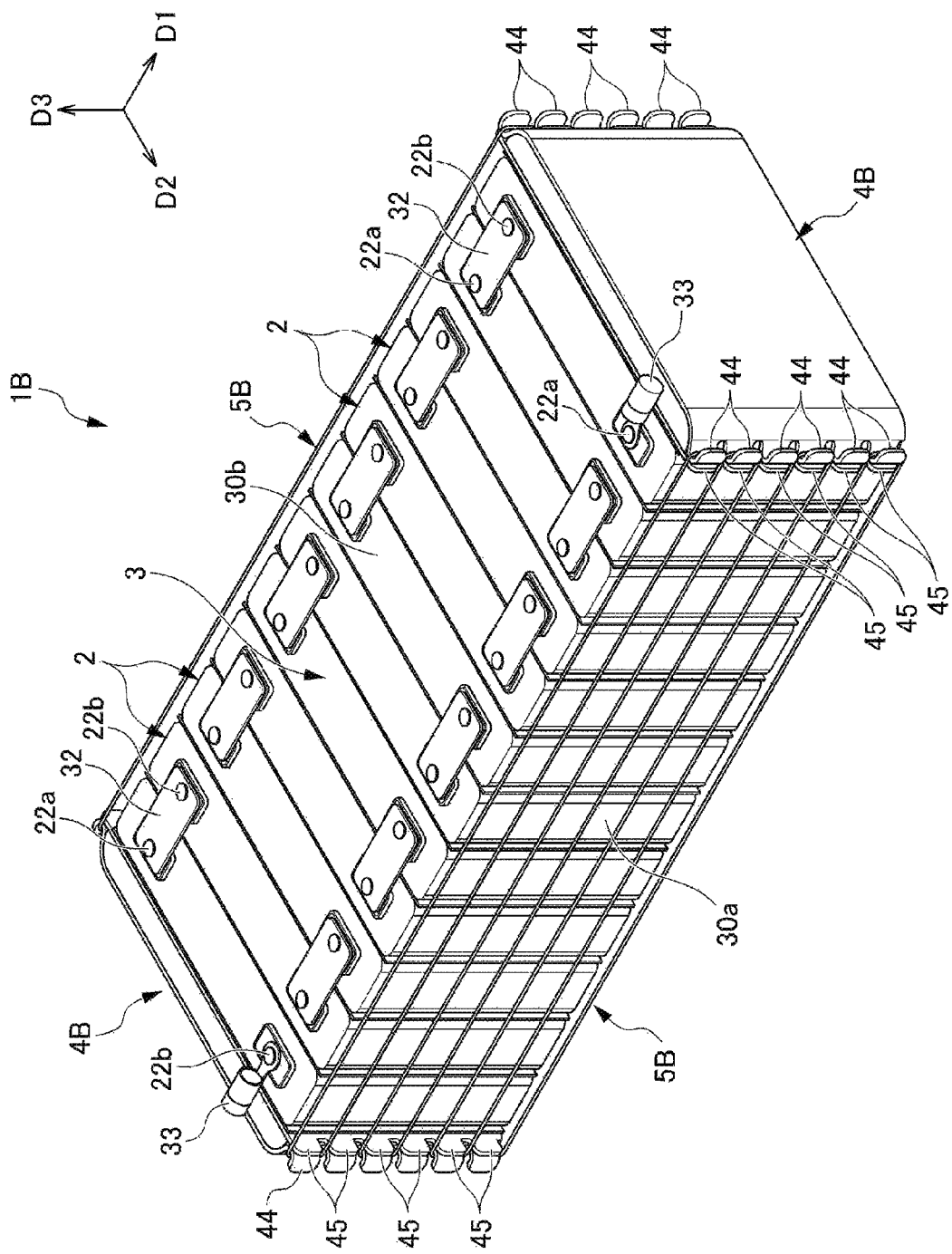
FIG. 12 is an overall perspective view showing still another embodiment of the battery module according to the disclosure.
Figure 13:
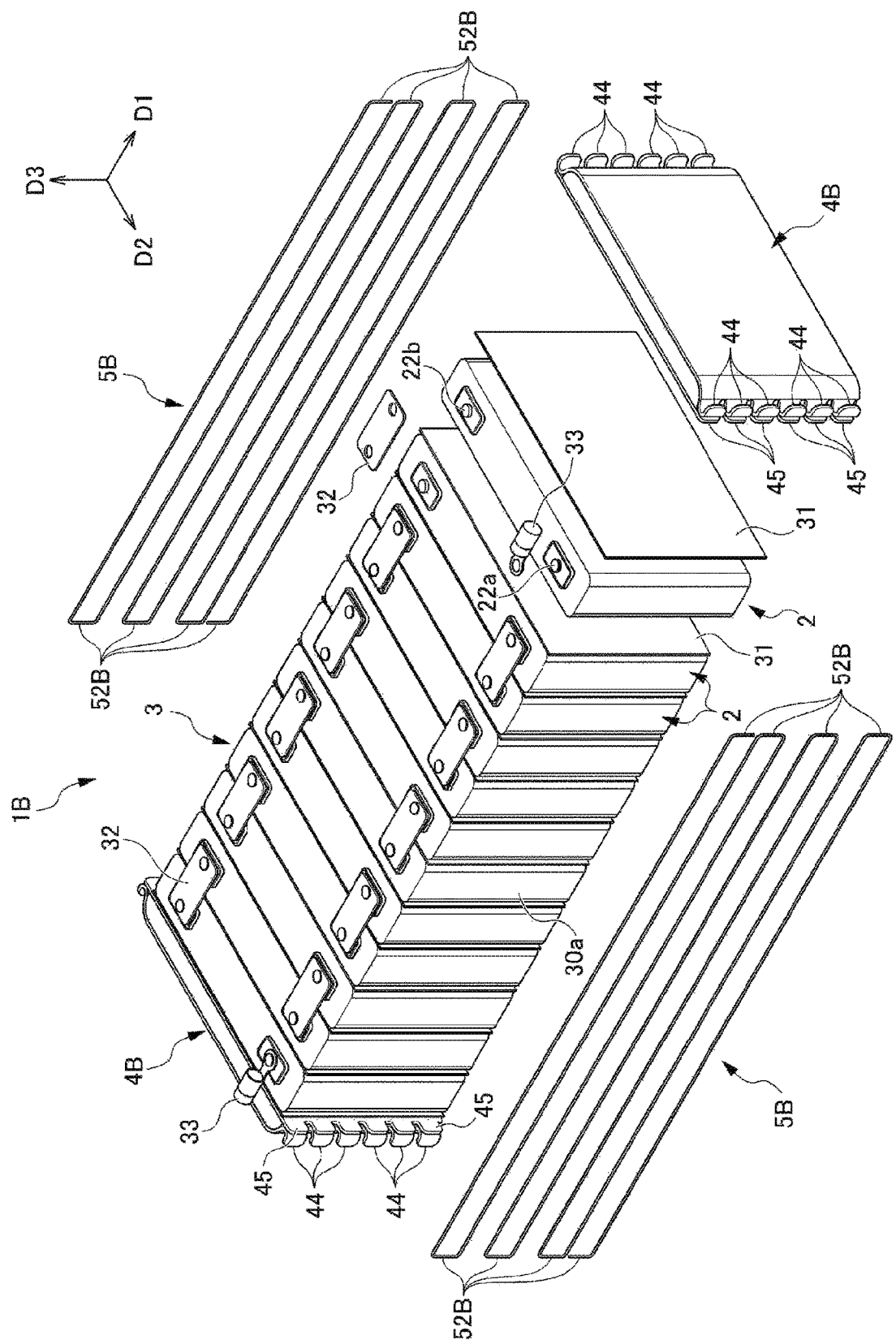
FIG. 13 is a perspective view in which one portion of the battery module shown in FIG. 12 is exploded and shown.
Figure 14:
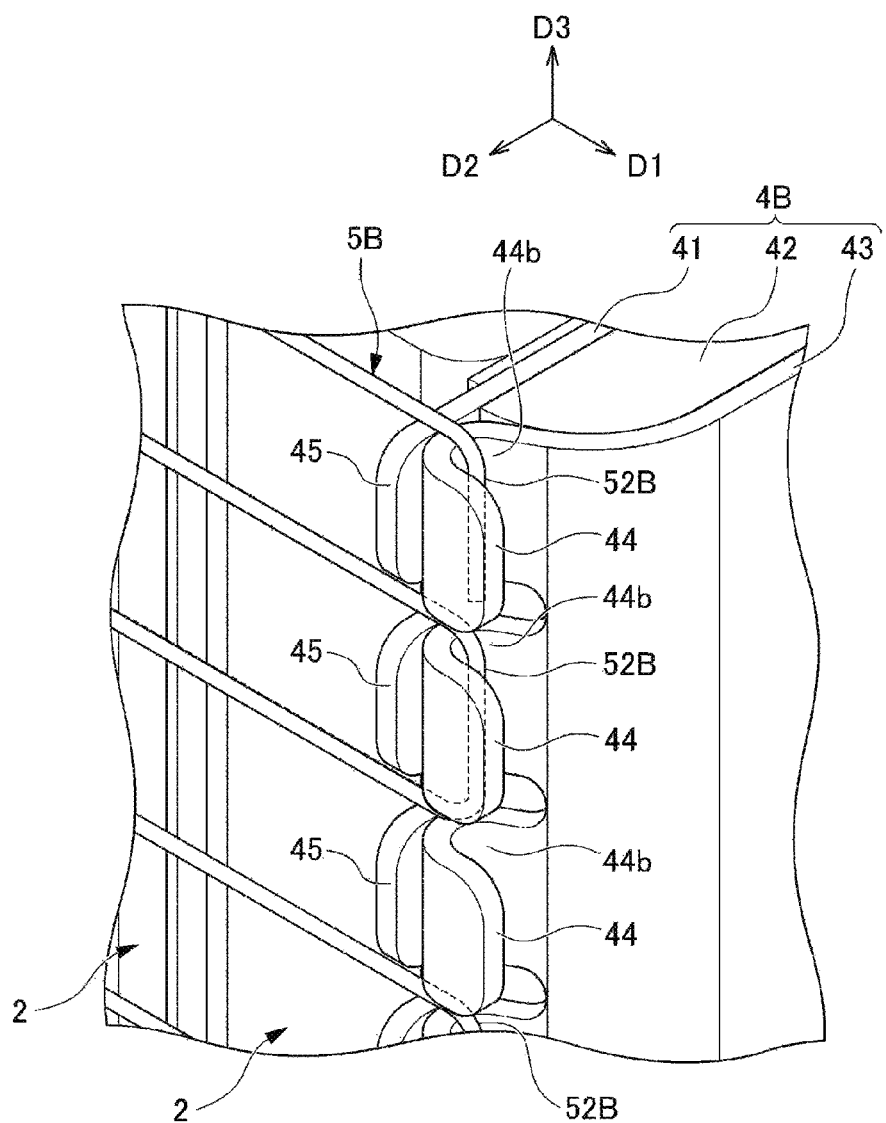
FIG. 14 is a perspective view in which a grappling structure of end plates and restraint members in the battery module shown in FIG. 12 is enlarged and shown.

A third embodiment of the battery module according to the disclosure is shown in FIG. 12-FIG. 14. Sites with the same symbols as the battery module 1 according to the first embodiment shown in FIG. 1 and FIG. 2 are sites with the same configurations, and thus the aforementioned description is used as specific description of those sites and is omitted here.

A battery module 1B according to the third embodiment is in common with the battery module 1 according to the first embodiment in that the battery module 1B has hook portions 44 on two end portions in a width direction of end plates 4B, but the battery module 1B is different from the battery module 1 according to the first embodiment in that restraint members 5B made of wire springs are used in place of the restraint members 5 made of sheet metal members.

The hook portions 44 and the support plate portions 45 of the end plates 4B are divided into a plurality of parts in the height direction. In the embodiment, the hook portions 44 and the support plate portions 45 respectively divided into six parts are disposed on two end portions in the width direction of the end plates 4B, but a division number of the hook portions 44 and the support plate portions 45 is not particularly limited.

On the other hand, the restraint members 5B made of wire springs are formed by making one piece of spring steel which is processed into a linear shape with a circular cross section meander in a manner of reciprocating repeatedly along a length direction of the battery module 1B. The restraint members 5B are arranged on two side surfaces 30a, 30a of the battery cell group 3 by alternately crossing over a plurality of hook portions 44 of the pair of end plates 4B, 4B.

The sites folded back in the length direction in the restraint members 5B are grappling portions 52B to the hook portions 44, and are sites to which the pulling stress is applied via the hook portions 44 by being grappled to the hook portions 44 and abutting against the inner side surfaces 44b of the hook portions 44. Starting end portions and finishing end portions of the restraint members 5B (the wire springs) are also respectively folded back at a substantially right angle to configure the grappling portions 52B.

Similar to the battery module 1 according to the first embodiment, the battery module 1B according to the third embodiment is also configured by grappling the grappling portions 52B of the restraint members 5B by each hook portion 44 of the end plates 4B to restrain the battery cell group 3. Therefore, the battery module 1B according to the third embodiment can also obtain an effect the same as the battery module 1 according to the first embodiment. Moreover, because the restraint members 5B are made of wire springs, the battery module 1B can be further reduced in weight compared with a case when the restraint members 5, 5A made of sheet metal members as shown in the first and second embodiments are used. In addition, in the restraint members 5B made of wire springs, the two side surfaces 30a, 30a of the battery cell group 3 can be set to a substantially open state, and thus it also becomes easy to take a heat dissipation measure or a cooling measure of the battery cells 2 using the two side surfaces 30a, 30a.

The battery module according to the disclosure is not limited to each embodiment described above and various change can be made within the scope of the disclosure. For example, the restraint members 5A of the battery module 1A may also be configured by wire springs.

In addition, the restraint members are not limited to be arranged only on one of the two side surfaces 30a, 30a of the battery cell group 3 and the upper surface 30b and the lower surface 30c of the battery cell group 3. Any one of the restraint members 5, 5A, 5B described above may also be arranged on both of the two side surfaces 30a, 30a and the upper surface 30b and the lower surface 30c of the battery cell group 3.

Furthermore, the end plates are not limited to the three-layer structures of the inner metal plate layers 41, the resin plate layers 42 and the outer metal plate layers 43. In addition, one or more layers may be further added to the end plates 4, 4A, and 4B in order to improve strength, rigidity and the like.

What is claimed is:

1. A battery module, comprising:
    a battery cell group, in which a plurality of battery cells is laminated;
    a pair of end plates, which is arranged on two end portions of the battery cell group along a lamination direction of the battery cells; and
    restraint members, which are disposed over the pair of end plates and restrain the battery cell group between the pair of end plates; wherein
    the restraint members are coupled to the pair of end plates by grappling structures on two end portions of the restraint members along the lamination direction of the battery cells, and
    the pair of end plates clamps the battery cell group in a state that the battery cell group is compressed along the lamination direction of the battery cells, and pulling forces toward opposite directions act on the two end portions of the restraint members by a restoration force when the battery cell group restores from the compression state,
    wherein the grappling structures are configured by grappling portions disposed on the two end portions of the restraint members, and hook portions on the end plates which are disposed corresponding to the grappling portions on the two end portions of the restraint members, wherein the hook portions on the end plates are inserted through the grappling portions on the two end portions of the restraint members to be grappled,
    wherein each of the end plates at least has a respective inner metal plate layer arranged on a side close to the battery cells, a respective outer metal plate layer arranged on a side away from the battery cells, and a respective resin plate layer arranged between the respective inner metal plate layer and the respective outer metal plate layer, and
    the respective resin plate layer has a thickness greater than a thickness of the respective inner metal plate layer and greater than a thickness of the respective outer metal plate layer;
    each of the respective hook portions is disposed on the respective outer metal plate layer; and
    two end portions in a width direction and/or a height direction of the respective outer metal plate layer is bent toward the respective inner metal plate layer, and thereby each of the respective hook portions is arranged closer to the respective inner metal plate layer than an outer end surface of the respective end plate.

2. The battery module according to claim 1, wherein the restraint members are arranged on two side surfaces of the battery cell group and/or upper and lower surfaces of the battery cell group.

3. The battery module according to claim 1, wherein the restraint members are configured by sheet metal members or wire springs.

4. The battery module according to claim 2, wherein the restraint members are configured by sheet metal members or wire springs.

5. The battery module according to claim 1, wherein
    each of respective inner side surfaces of the hook portions is a concave surface, and
    each of a respective abutment portion of the grappling portions, which is grappled to one of the hook portions and abuts against the respective inner side surface thereof, have an R-shape curved in a same direction as a curving direction of the respective inner side surface or a shape chamfered in the same direction as the curving direction of the respective inner side surface.

6. The battery module according to claim 2, wherein
each of respective inner side surfaces of the hook portions is a concave surface, and
each of a respective abutment portion of the grappling portions, which is grappled to one of the hook portions and abuts against the respective inner side surface thereof, have an R-shape curved in a same direction as a curving direction of the respective inner side surface or a shape chamfered in the same direction as the curving direction of the respective inner side surface.

7. The battery module according to claim 3, wherein
each of respective inner side surfaces of the hook portions is a concave surface, and
each of a respective abutment portion of the grappling portions, which is grappled to one of the hook portions and abuts against the respective inner side surface thereof, have an R-shape curved in a same direction as a curving direction of the respective inner side surface or a shape chamfered in the same direction as the curving direction of the respective inner side surface.

8. The battery module according to claim 4, wherein
each of respective inner side surfaces of the hook portions is a concave surface, and
each of a respective abutment portion of the grappling portions, which is grappled to one of the hook portions and abuts against the respective inner side surface thereof, have an R-shape curved in a same direction as a curving direction of the respective inner side surface or a shape chamfered in the same direction as the curving direction of the respective inner side surface.

9. The battery module according to claim 1,
wherein the respective inner metal plate layer has a respective support plate portion which is arranged to be capable of supporting an inner end portion of a side of the battery cell group in the hook portions.

10. A manufacturing method of battery module, comprising:
arranging end plates on two end portions in a lamination direction of battery cells in a battery cell group configured by laminating a plurality of battery cells;
compressing the battery cell group along the lamination direction of the battery cells by applying a compression force to the battery cell group via the pair of end plates;
arranging restraint members along the lamination direction of the battery cells on the battery cell group being in a compression state; and
using a restoration force of the battery cell group by releasing the compression force toward the battery cell group to grapple and couple two end portions of each of the restraint members by the pair of end plates, and pulling forces toward opposite directions acting on each of the two end portions of the restraint members.

* * * * *